United States Patent [19]

Gingerich et al.

[11] 4,381,937
[45] May 3, 1983

[54] METHOD FOR PRODUCING COBALT METAL POWDER

[75] Inventors: Richard G. Gingerich; Clarence D. Vanderpool; Richard A. Scheithauer; Martin B. MacInnis, all of Towanda, Pa.

[73] Assignee: GTE Products Corporation, Stamford, Conn.

[21] Appl. No.: 304,400

[22] Filed: Sep. 21, 1981

[51] Int. Cl.³ ............................................. B22F 9/00
[52] U.S. Cl. .............................. 75/0.5 AA; 75/103; 75/119; 423/34
[58] Field of Search ......... 423/34; 75/0.5 A, 0.5 AA, 75/0.5 AB, 0.5 BA, 103, 118 P, 118 R, 119

[56] References Cited

U.S. PATENT DOCUMENTS

| | | | |
|---|---|---|---|
| 3,549,337 | 12/1970 | Palmer | 428/932 |
| 3,833,351 | 9/1974 | Neskova et al. | 75/118 R |
| 4,131,454 | 12/1978 | Piret et al. | 75/118 R |
| 4,233,063 | 11/1980 | Ritsko et al. | 75/0.5 AA |
| 4,234,333 | 11/1980 | Ghandehari et al. | 75/0.5 BA |
| 4,256,704 | 3/1981 | Howard | 75/118 P |

*Primary Examiner*—Michael L. Lewis
*Attorney, Agent, or Firm*—R. E. Walter

[57] ABSTRACT

In a process for producing fine cobalt metal powder from scrap material containing brazing compositions, the scrap is digested with hydrochloric acid to form a cobalt chloride solution which the silver is removed by precipitation with a suitable alkali metal halide at a pH of about 7 to result in a cobalt amine chloride solution which is further processed to fine cobalt powder.

3 Claims, No Drawings

METHOD FOR PRODUCING COBALT METAL POWDER

TECHNICAL FIELD

This invention relates to an improved process for producing cobalt metal powder from scrap material of the type including cobalt and silver.

BACKGROUND

U.S. Pat. No. 4,218,240 to Gingerich, et al. relates to a process wherein cobalt is recovered by treating aqueous solutions containing ammonia and cobalt irons with sufficient amount of an acid in the presence of a catalyst to convert the cobalt irons to a cobalt hexammine ion which is precipitated and separated from the resulting solution. The precipitate is dissolved in an aqueous solution to form a relatively pure solution which is treated with a metallic hydroxide to form a cobalt containing precipitate which is reduced to form fine particles of cobalt.

According to the above basic process, some silver may be removed during the normal purification steps during filtration of the aqueous cobaltic hexammine solution. Transition metals are removed by filtration at a pH of about 7.0 but silver chloride or a complex of silver is soluble at these conditions and is not removed from the cobalt containing filtrate. Typical scrap materials may contain relatively large amounts of silver due to the use of silver in brazing alloys so that the above problem is detrimental to the production of high purity cobalt powder.

SUMMARY OF THE INVENTION

By the improvement of the present invention, silver which is typically present in brazes can be desirably removed with a single treatment without adversely effecting the cobalt concentration.

In accordance with the present invention, there is provided a process for producing fine particle size cobalt metal powder from scrap material comprising cobalt and silver, said process comprising digesting said scrap material in aqueous hydrochloric acid to produce an aqueous acid cobalt chloride solution containing silver ions, complexing cobalt present in said aqueous acid cobalt chloride solution with ammonia to form a cobalt ammine chloride solution, contacting said cobalt ammine chloride solution at a pH of about 7 with a sufficient amount of alkali metal bromide or alkali metal iodide wherein the alkali metal is lithium, sodium or potassium, to form a silver bromide or silver iodide precipitate, removing said precipitate from the resulting cobalt ammine chloride solution, forming a cobalt containing precipitate, and reducing said cobalt containing precipitate to form a cobalt metal powder.

DETAILED DESCRIPTION

The present invention is directed to a process for recovering cobalt in the form of cobalt powder from a cobalt source. The present invention is particularly suited to the recovery of cobalt from scrap material containing cemented refractory metal carbides and brazing compositions of silver. The binder most commonly used for refractory metal carbide is cobalt.

The level of cobalt depends upon the end use of the cemented carbide but most commercial cemented refractory metal carbides contain from about 4 to 25% by weight cobalt. The scrap material is digested in an aqueous hydrochloric acid solution for a sufficient time to produce an aqueous acid cobalt chloride solution. Preferably an azeotropic hydrochloric acid solution is used which comprises about 20 percent hydrochloric acid and has a boiling point of about 110° C. While both higher and lower concentrations of acid than the azeotrope can be initially used, water is given off until the azeotrope is reached when weaker acids are used and hydrochloric acid is given off when stronger acids than the azeotropic acids are used. As a result, the azeotropic concentration is reached after prolonged digestion of the scrap. Preferably, an excess of hydrochloric acid is used in an amount greater than at least 200 percent of the amount theoretically required to react with the scrap material.

After digestion under the above conditions, the refractory metal carbide is depleted of cobalt, that is it generally contains less than about 0.5 percent by weight cobalt. The resulting solution contains a variety of anions and cations such as iron, manganese, copper, aluminum, chromium, magnesium, nickel, calcium, sodium, potassium, silver, etc. Preferably cobalt is present as the major cation and chloride as the major anion with other cations and anions being present in minor proportions. Typical solutions have a cobalt concentration of from 40 to about 150 grams per liter in about 1 to about 6 molar hydrochloric acid solution and less than about 10 grams per liter of silver. The solid portion which comprises the refractory metal carbide may be conveniently separated from the aqueous acid cobalt chloride solution containing the additional anions and cations.

The resulting aqueous acid cobalt chloride solution is the complexed with ammonia to form a cobalt ammine chloride solution. As set forth in U.S. Pat. No. 4,218,240, which is incorporated by reference into the present application, the cobalt iron is converted to the cobaltic hexammine complex ion in the presence of a catylist. Due to the addition of ammonium hydroxide, the pH of the aqueous acid cobalt chloride solution is increased and a variety of cations precipitate. The sludge or precipitate which contains transition metals is separated from the cobalt ammine chloride solution to give a purified aqueous cobaltic hexammine halide solution.

In accordance with the principles of the present invention, the aqueous cobalt ammine chloride solution at a pH of about 7 is contacted with a sufficient amount of alkali metal bromide or alkali metal iodide wherein the alkali metal is lithium, sodium or potassium, to form a silver bromide or silver iodide precipitate. Preferably sufficient alkali metal halide of the above type is used to reduce the silver concentration to less than 0.005 grams/liter, preferably to less than 0.003 grams/liter, and more preferably to less than 0.002 grams/liter. The amount of alkali metal halide used varies depending on the type used and amount of silver in solution. The silver halide precipitate may be separated from the resulting cobalt amine halide solution to further purify the cobalt ammine halide solution.

Next, the solution is acidified in the presence of halide irons to form a cobaltic hexammine halide precipitate. The precipitate may be separated from remaining solution by conventional liquid-solid separation processes to give an even more purified cobaltic hexammine halide. Next, the precipitated cobalt hexammine halide is dissolved in water and treated so as to form a cobalt containing precipitate. The cobalt containing precipitate is reduced to form a cobalt metal powder. These later steps are described in U.S. Pat. No. 4,218,240.

EXAMPLE 1

Scrap material containing about 454 parts of rectangular-shaped pieces of cemented carbide having dimensions of less than about one square inch and containing silver in an amount typically present as a braze associated with the carbide is digested under reflex for about seven days with about 717 parts of azeotropic (20.24 percent HCl). At the end of this time, the carbide is in the form of a depleted skeleton with the braze and cobalt in solution. The resulting aqueous chloride solution is processed according to the process described in Example 1 of U.S. Pat. No. 4,218,240. Except that after filtering the sludge from the aqueous cobaltic ammine halide solution, the resulting solution at a pH of 7 is contacted with about 0.10 grams of potassium iodide per liter of solution to precipitate silver iodide which is removed by filtration. The remainder of the process described in the above U.S. patent is performed to produce fine metal cobalt powder.

EXAMPLE 2

Iodide ion is more efficient at removal of silver from the cobalt solutions than bromide ion. Tests which were conducted with equal volumes of a mixture of hexamminecobalt (III) chloride and silver at a pH value of 7.0 with various amounts of sodium bromide or potassium iodide demonstrate that 10 times more bromide than iodide is required to precipitate the silver (see Table 1).

TABLE I

| Tests to determine the amount of $Br^-$ or $I^-$ that is required to precipitate $Ag^+$. | | | | |
|---|---|---|---|---|
| Test No. | Salt type | Salt gms. | Co g/l | Ag g/l |
| 1 | — | — | 13 | 0.007 |
| 2 | NaBr | 0.05 | 13 | 0.003 |
| 3 | NaBr | 0.10 | 13 | 0.002 |
| 4 | NaBr | 0.50 | 9.5 | <0.002 |
| 5 | NaBr | 1.10 | 6.5 | <0.002 |
| 6 | — | — | 14 | 0.006 |
| 7 | KI | 0.05 | 13 | <0.002 |
| 8 | KI | 0.10 | 14 | <0.002 |
| 9 | KI | 0.50 | 13 | <0.002 |
| 10 | KI | 1.0 | 11 | <0.002 |

Although the present invention has been described in conjunction with specific embodiments, it is to be understood that modifications and variations may be made therefrom without departing from the spirit and scope of the invention.

INDUSTRIAL APPLICABILITY

The method described and claimed herein is particularly useful in the formation of fine particle size cobalt powders of high purity, which are useful, for example, as starting material formation of cemented carbides.

We claim:

1. A process for producing fine particle size cobalt metal powder from scrap material comprising cobalt and silver, said process comprising digesting said scrap material in aqueous hydrochloric acid to produce an aqueous acid cobalt chloride solution containing silver ions, complexing cobalt present in said aqueous acid cobalt chloride solution with ammonia to form a cobalt ammine chloride solution, contacting said cobalt ammine chloride solution at a pH of about 7 with a sufficient amount of alkali metal bromide or alkali metal iodide wherein the alkali metal is lithium, sodium or potassium, to form a silver metal bromide or silver iodide precipitate, removing said precipitate from the resulting cobalt ammine chloride solution, forming a cobalt containing precipitate, and reducing said cobalt containing precipitate to form a cobalt metal powder.

2. A process for producing fine particle size cobalt metal according to claim 1 wherein said scrap material comprises cemented metal carbide having cobalt metal binder and silver present as a braze compound, wherein said digesting of said cemented metal carbide is performed for a sufficient period of time to dissolve said cobalt metal binder and produce a solid portion comprising metal carbide and said aqueous acid cobalt chloride solution containing other cations including silver, separating said solid portion from said aqueous acid.

3. A process for producing fine particle size cobalt metal powder according to claim 2 wherein complexing produces a sludge and said sludge is removed.

* * * * *